United States Patent [19]

Akiba et al.

[11] Patent Number: 4,899,446

[45] Date of Patent: Feb. 13, 1990

[54] HAND-HELD MACHINE WITH POWER DISENGAGING MEANS

[75] Inventors: Genji Akiba, Kamiiwahashi; Kohya Tanaka, Narashino; Shigetoshi Ishida, Chiba, all of Japan

[73] Assignee: Tanaka Kogyo Co., Ltd., Chiba, Japan

[21] Appl. No.: 265,250

[22] Filed: Oct. 31, 1988

[51] Int. Cl.$^4$ .............................................. B26B 7/00
[52] U.S. Cl. ..................................... 30/276; 30/296.1; 56/12.7
[58] Field of Search ................. 30/276, 296, 166, 340, 30/121; 192/108, 45; 56/12.7, 12.6

[56] References Cited
U.S. PATENT DOCUMENTS 4,122,601 10/1978 Katsuya ........................... 30/276 X Primary Examiner—Frank T. Yost
Assistant Examiner—Willmon Fridie, Jr.
Attorney, Agent, or Firm—Frishauf, Holtz, Goodman & Woodward

[57] ABSTRACT

A hand-held machine such as a cleaver or cutter having an engine as the driving source and wherein the drive shaft pipe is formed by telescopically extendable pipe members provided with a fixing means for fixing the pipe members relative to each other. The rotational force of the engine is transmitted to the cutter member via a first drive shaft having a circular section, at least one-way clutch and a second drive shaft on the side of the cutter member, to thereby minimize the size of the device for convenient transportation/storage, to improve the work efficiency, and to secure the safety of the operator.

12 Claims, 3 Drawing Sheets

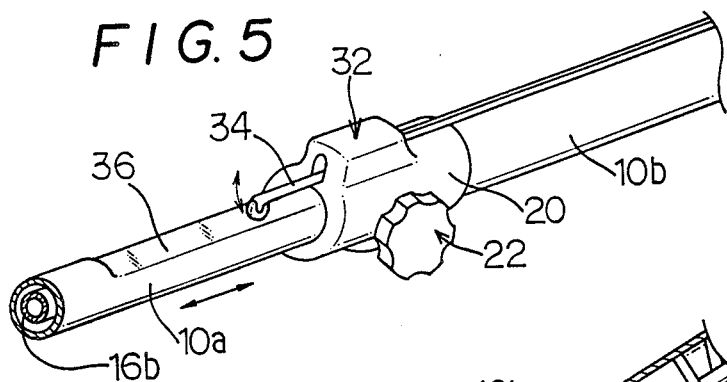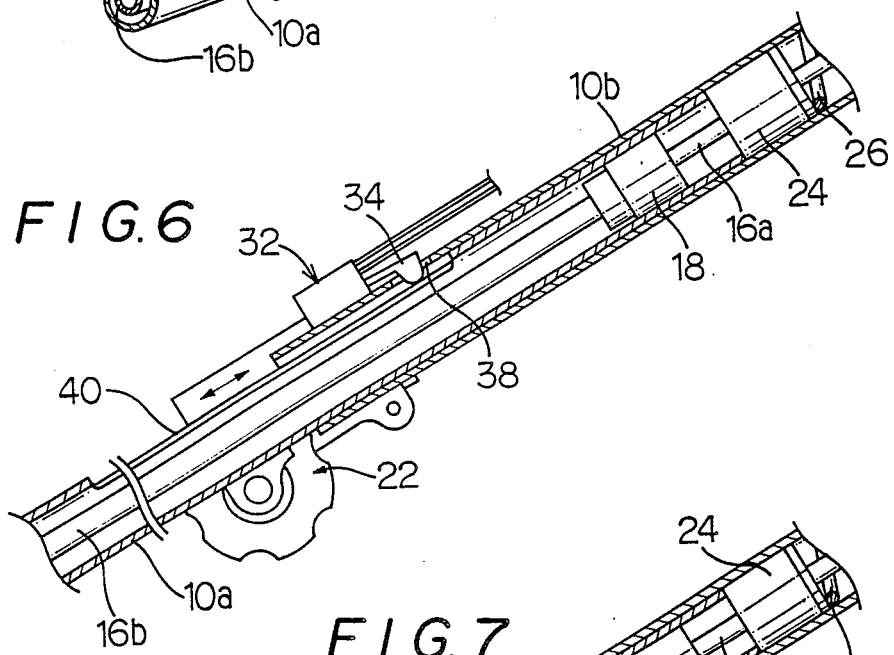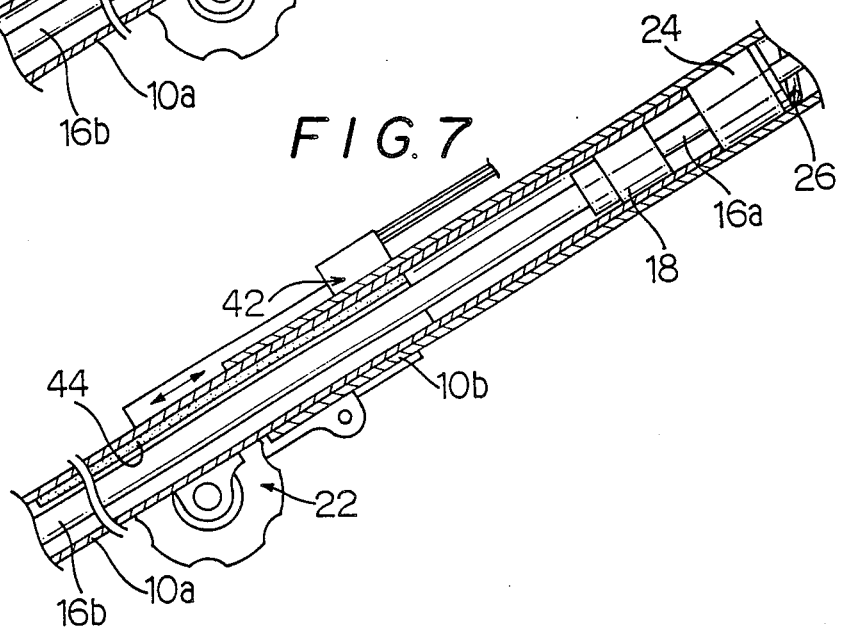

HAND-HELD MACHINE WITH POWER DISENGAGING MEANS

BACKGROUND OF THE INVENTION AND RELATED ART STATEMENT

This invention relates to an improvement in hand-held machines such as cutters which are driven by a small engine.

Generally a hand-held machine such as a cleaver or cutter comprises an operational means like a cutter blade which is rotatably provided at an end of a drive shaft pipe which connects the operational means with a driving mechanism such as an engine to rotate the operational means at high speed.

Since the length of the drive shaft pipe of the aforementioned hand-held machine is generally determined to allow the users to work in a comfortable posture, the length between the driving mechanism and the operational means tends to become long. They inconveniently require extensive space during transportation and storage, and present problems in working efficiency depending on the location or topography of the land.

In order to solve such problems, there has been proposed a hand-held machine wherein a drive shaft pipe which is telescopically constructed internally houses a shaft of the driving mechanism side with a joint of a special shape and another shaft of the operational means which can receive the joint of such special shape. However, the proposed machine is not completely free of problems as it has inferior sectional strength on the drive shaft, and rotational force cannot be transmitted smoothly due to play in the joint.

SUMMARY OF THE INVENTION

Accordingly this invention aims to provide a hand-held machine having an operational means which is attached rotatably at an end of a drive shaft pipe, and which is connected to a driving mechanism via a drive shaft for rotation. The drive shaft pipe comprises a first drive shaft pipe of smaller diameter on the side of the operational means and a second drive shaft pipe of slightly larger diameter o the side of the driving mechanism to which said smaller diameter pipe is inserted. The second drive shaft comprises a shaft of circular section on the side of the driving mechanism and another shaft pipe on the side of the operational means to which said circular section shaft is inserted. At least one one-way clutch is provided in an end of the shaft pipe on the side of the operational means to be engaged with said circular section shaft. A fixing means is attached on the larger diameter drive shaft pipe for fixedly retaining the smaller diameter drive shaft pipe in the axial direction thereof so as to prevent the sectional strength from deteriorating as well as to enhance smooth transmission of rotational force.

In the hand-held machine of the present invention, the rotational force of a driving mechanism such as an engine is transmitted to the operational means via drive shaft with a circular section, a one-way clutch and a drive shaft pipe on the side of the operational means. A bearing member is provided inside the drive shaft pipe in a manner to be flexibly retained in order to axially support the shaft so that the displacement of the shaft may be prevented even at the time of rotation.

The drive shaft with the circular section on the side of the driving mechanism may have a smaller diameter at a portion thereof. If the diameter is designed too small to be connected to the other shaft with the one-way clutch, the transmission of the rotational force may be suspended if necessary. Moreover, if a switching means is mounted on the fixing means, and is operated by a switch provided o the smaller diameter drive shaft pipe in the longitudinal direction, risks which otherwise may be produced when a user grips the shaft at a position too close to the operational means could be avoided in advance.

BRIEF DESCRIPTION OF THE DRAWINGS

FIG. 5 is a perspective view of the essential elements of the cleaver shown FIG. 4.

FIGS. 6 and 7 are sectional views of the embodiment corresponding to the ones in FIG. 5.

THE PREFERRED EMBODIMENTS OF THE INVENTION

Figure 1:
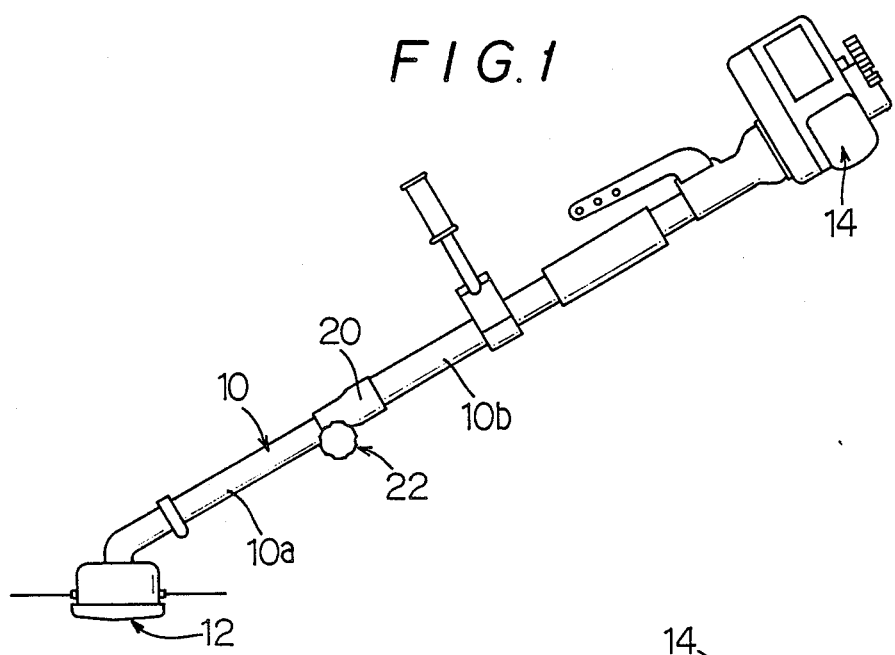
FIG. 1 is a perspective view showing a cleaver as a preferred embodiment of the hand-held machine according to this invention.
Figure 2:
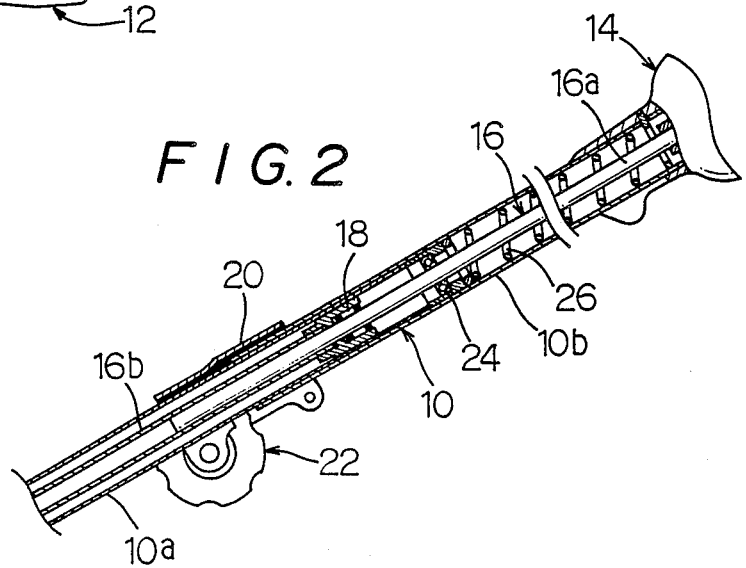
FIG. 2 is sectional view of essential elements of the cleaver shown in FIG. 1.

The preferred embodiments of the hand-held machine or the cleaver in accordance with the present invention are now described in more detail referring to the attached drawings, In Figs. 1 and 2 the cleaver or cutting device according to this invention comprises a nylon cord cutter 12 which is rotatably mounted on an end of a drive shaft pipe 10. The cleaver cuts and cleaves weeds and grass by means of the cutter 12 which is driven to rotate at high speed by the output from engine 14 the rotation of which is transmitted via a drive shaft means 16.

The drive shaft pipe 10 comprises a first drive shaft pipe section 10a on the side of the nylon cord cutter 12, and a second drive shaft pipe section 10b on the side of the engine 14 and having a slightly larger diameter than the first drive shaft pipe section 10a so as to receive therein the first pipe section 10a, the first and second drive shaft pipe sections 10a, 10b being movable relative to each other axially in a telescopic mode.

The drive shaft means 16 comprises a first drive shaft 16a on the side of the engine 14 having a circular cross-section, a second pipe-like drive shaft 16b which sheathes the first drive shaft 16a on the side of the cutter 12, and a one-way clutch 18 provided at one end of the second drive shaft 16b which is actuated by normal rotation of the first drive shaft 16a. Although a solid shaft of circular section is used as the first drive shaft 16a in this embodiment, a pipe may be used as the first drive shaft 16a for minimizing the weight of the device.

An end of the second drive shaft pipe section 10b is attached to a sleeve-like cover member 20 and a fixing means 22 is provided on the cover member 20. By manipulation of said fixing means 22 with a knob, the first drive shaft pipe section 10a may be retained fixedly at a predetermined axial position relative to the second drive shaft section 10b. Suitable stop means should be provided at respective ends of drive shaft pipe sections 10a and 10b.

A bearing member 24 of the first shaft 16a is provided movably in the second drive shaft pipe section 10b, and is attached with a coil spring 26 to the main body of a driving mechanism including the engine 14 via the second drive shaft pipe section 10b (refer to FIG. 2).

The cleaver thus structured is operated in practice as follows: the first drive shaft pipe section 10a and the first drive shaft 16a of circular section are slid along the second drive shaft pipe section 10b and the second drive shaft 16b for a suitable distance by manipulating the fixing means 22 so as to have a desired overall length, and the length of the drive shaft pipe 10 is fixed with the fixing means 22. The rotational force of the engine 14 is transmitted constantly in this arrangement to the nylon cord cutter 12 via the first drive shaft 16a, one-way clutch 18 and the second drive shaft 16b. As the rotational force is constantly transmitted to nylon cord cutter 12 intact, there will be no chattering or deterioration in sectional strength. Further, when the cleaver is used at a relatively flat place having a small gradient, the lengths of the drive shaft pipe 10 and the drive shaft means 16 may be determined arbitrarily simply by manipulating the fixing means 22.

Due to the effect of the coil spring 26 used for flexibly retaining the bearing 24 in the axial direction, the first drive shaft 16a is conveniently supported axially so that no displacement of the shaft means 16 would be produced at the time of rotation.

Figure 3:
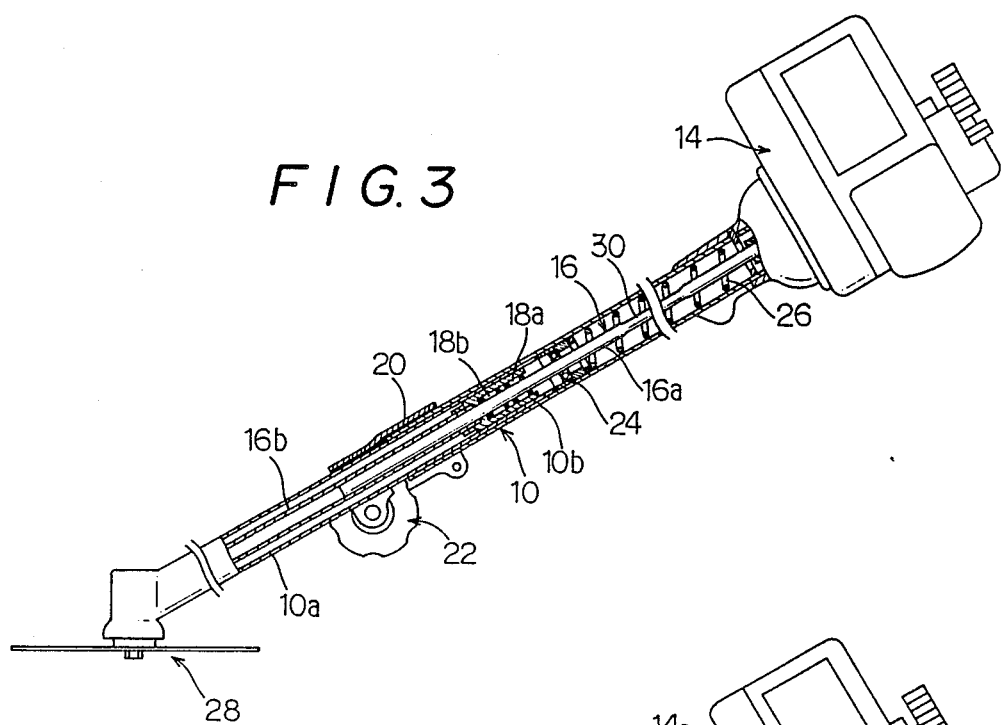
FIGS. 3 and 4 are partial sectional views showing another embodiment of the cleaver as another preferred embodiment of the present invention.

FIG. 3 shows another cleaver embodying the present invention wherein a steel cutter blade 28 receiving substantially no load at the time of rotation is used as a cleaving means in place of the nylon cord cutter 12 on which load is constantly applied. Further, a one-way clutch 18a which is actuated with the normal rotation of the first drive shaft 16a and another one-way clutch 18b which is actuated with the reverse rotation of the first drive shaft 16a are provided adjacent to each other at the end of the shaft on the side of the cutter 28, and the first drive shaft 16a is reduced in diameter at a predetermined position.

This embodiment not only achieves an effect similar to the first embodiment, but also conveniently prevents vibration or noises by virtue of the provision of the pair of one-way clutches 18a, 18b which may otherwise be caused by the inertia of the steel cutter blade 28 when the revolution rate of the engine is once reduced and then increased. Even if the length of the shaft is adjusted erroneously too short, the transmission of the rotational power is broken instantaneously at the point 30 when the first drive shaft 16a is aligned with the one-way clutch 18a where the diameter of first drive shaft 16a is narrowed to thereby further secure the safety of users.

If the bearing of the one-way clutch 18b is made of such elastic materials as rubber, the impact felt on the device when the steel cutter contacts a stone or the like will not cause a bite by the one-way clutch into the shaft. This also contributes to reduction of cost of manufacture.

Figure 4:
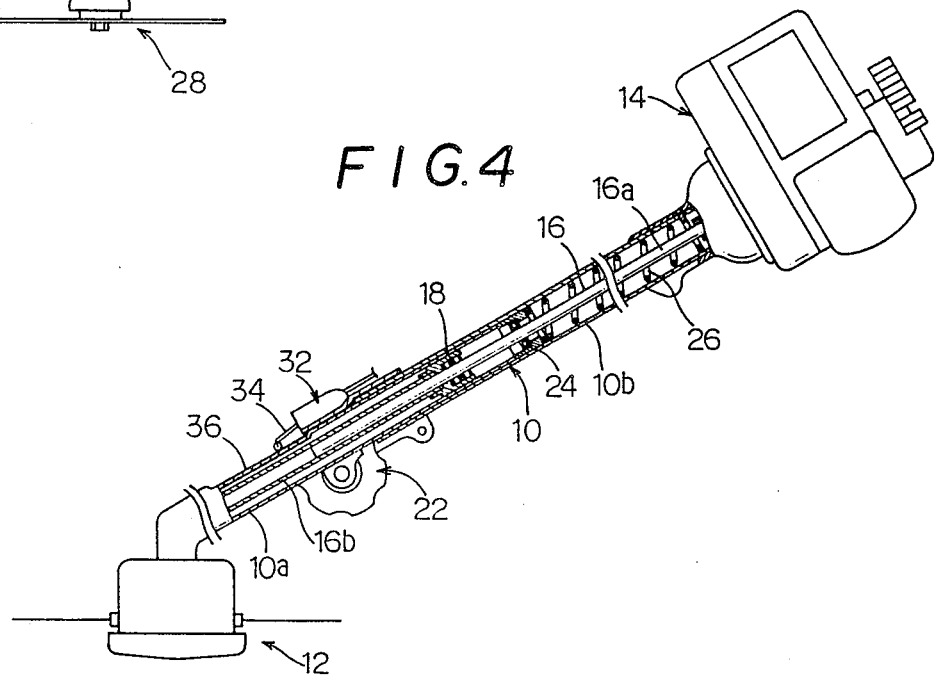

FIGS. 4 and 5 show another cleaver embodying the hand-held machine according to this invention wherein an engine switch 32 is provided on the fixing means 22, and a lever 34 for the switch 32 is attached in a manner to extend over a flat handle section 36 on the surface of the first drive shaft pipe section 10a longitudinally.

In addition to the effect similar to the first embodiment, this embodiment can avoid various types of dangers which might otherwise be inflicted on users. For instance, if the length of the engine shaft is excessively shortened, or the shaft is twisted from the housing means peripherally to disengage the lever 34 from the section 36, the engine 14 will be stopped instantly. A similar effect can be attained even if the lever 34 of the switch 32 is structured to extend over a slit 40 opened on the peripheral surface of the first drive shaft pipe section 10a via a hole 38 (refer to FIG. 6) or if the switch is replaced by a magnetic switch 42 having a magnet 44 as an operational means positioned inside of the drive shaft pipe section 10a (refer to FIG. 7).

As stated above, as the length of the hand-held machine of the present invention can be adjusted arbitrarily, it can enhance workability as well as minimize the space necessary for transportation or storage. Moreover, the rotational force of the driving mechanism can securely be transmitted to the operational means via the first drive shaft, one-way clutch and operational side second drive shaft, and the problems encountered in the prior art such as the reduction of sectional area can be avoided to further secure effective operation. It can effectively prevent vibration or noises and can secure the safety of users.

Although description is made in the foregoing of preferred embodiments of this invention, it should be understood that the present invention is in no way limited to these embodiments, and various changes and modifications in design can be made within the scope of this invention without departing from the spirit of the present invention.

What is claimed is:

1. A hand-held machine comprising:
    a drive shaft pipe means which is extendable in the lengthwise direction thereof;
    an operational means rotatably attached at an end of said drive shaft pipe means;
    a driving mechanism coupled to the another end of said drive shaft pipe means;
    drive shaft means rotatably mounted in said drive shaft pipe means, said drive shaft means being extendable in the lengthwise direction thereof and being coupled at one end to said operational means and at another end to said driving mechanism;
    said drive shaft pipe means comprising a first pipe section of given diameter on the side of said operational means, and a second pipe section of a different diameter than said first pipe section on the side of said driving mechanism, the smaller diameter of said first and second pipe sections being slidably inserted in the other of said pipe sections for extending or contracting the drive shaft pipe means in the lengthwise direction thereof;
    said drive shaft means comprising a first drive shaft member of substantially circular outer periphery provided on the side of said driving mechanism, and a second pipe-like drive shaft member provided on the side of said operational means, said first drive shaft member being engaged with and inserted in said second drive shaft member for extending and contracting said drive shaft means in the lengthwise direction thereof;
    at least one one-way clutch coupled to said second pipe-like drive shaft member at an end portion thereof which is engaged with said first drive shaft member, said at least one one-way clutch being movable along said first drive shaft on the driving mechanism side and operatively coupling said drive shaft member together to transmit rotary motion from said driving mechanism to said operational means via said drive shaft members;

means for disengaging said driving mechanism from said operational means responsive to the length of said drive shaft type means becoming shorter than a predetermined length, said disengaging means being operatively coupled to at least one of said one-way clutch and said driving mechanism; and fixing means provided on said drive shaft pipe means where said first and second drive shaft pipe sections are engaged with each other, to fixedly support the smaller diameter drive shaft pipe section at an axial position relative to the larger diameter drive shaft pipe section.

2. The hand-held machine of claim 1, wherein said first drive shaft member on the side of said driving mechanism is a solid elongated member of circular cross-section.

3. The hand-held machine of claim 2, wherein said first pipe section of said drive shaft pipe means has a smaller diameter than said second pipe section of said drive shaft pipe means.

4. The hand-held machine of claim 1, wherein said first pipe section of said drive shaft pipe means has a smaller diameter than said second pipe section of said drive shaft pipe means.

5. The hand-held machine of claim 2, wherein said fixing means is provided on said second pipe section of said drive shaft pipe means.

6. The hand-held machine of claim 3, wherein said fixing means is provided on said second pipe section of said drive shaft pipe means.

7. The hand-held machine of claim 4, wherein said fixing means is provided on said second pipe section of said drive shaft pipe means.

8. The hand-held machine of claim 1, further comprising:

bearing means within said drive shaft pipe means for axially supporting said first circular section drive shaft; and means for resiliently biasing said bearing means within said drive shaft pipe means so as to bias said bearing means toward said operational means.

9. The hand-held machine of claim 8, wherein said biasing means comprises a coil spring surrounding a portion of the length of said first drive shaft member.

10. The hand-held machine of claim 1, wherein said disengaging means comprises:

switch means coupled to said driving mechanism and provided on said fixing means for stopping said driving mechanism upon operation of said switch means; and switch manipulating means for operating said switch means, provided so as to extend in the longitudinal direction of the smaller diameter drive shaft pipe.

11. The hand-held machine of claim 10, wherein said switch means is operable responsive to the length of said drive shaft pipe means becoming shorter than said predetermined length.

12. The hand-held machine of claim 1, wherein said disengaging means comprises a reduced outer diameter portion of said first drive shaft member on the side of said driving mechanism, said reduced outer diameter portion being provided at a predetermined axial position on said first drive shaft member, for disengaging said first drive shaft member from said at least one one-way clutch when said at least one one-way clutch is in registration with said reduced outer diameter portion.

* * * * *